Sept. 30, 1958 L. J. JOHNSON 2,854,617
FREQUENCY CONTROL APPARATUS FOR ALTERNATORS
Filed Jan. 24, 1957 5 Sheets-Sheet 1

INVENTOR.
LEOPOLD J. JOHNSON
BY
*Christie, Parker & Hale*
ATTORNEYS

Sept. 30, 1958 L. J. JOHNSON 2,854,617
FREQUENCY CONTROL APPARATUS FOR ALTERNATORS
Filed Jan. 24, 1957 5 Sheets-Sheet 2

INVENTOR.
LEOPOLD J. JOHNSON
BY
Christie, Parker & Hale
ATTORNEYS

Sept. 30, 1958 L. J. JOHNSON 2,854,617
FREQUENCY CONTROL APPARATUS FOR ALTERNATORS
Filed Jan. 24, 1957 5 Sheets-Sheet 5

INVENTOR.
LEOPOLD J. JOHNSON
BY
ATTORNEYS

United States Patent Office 2,854,617
Patented Sept. 30, 1958

2,854,617
FREQUENCY CONTROL APPARATUS FOR ALTERNATORS

Leopold J. Johnson, Anaheim, Calif., assignor to Siegler Corporation, Anaheim, Calif., a corporation Application January 24, 1957, Serial No. 636,111

10 Claims. (Cl. 322—32)

This invention relates to apparatus for controlling the frequency of alternating current which is produced by an alternator.

Ordinarily alternators are employed when substantial amounts of alternating current are required. In many instances it is necessary to provide accurate control over the frequency of the alternating current which is produced by an alternator. Usually frequency control is effected by controlling the speed of rotation of the alternator since the frequency of the alternating current is proportional to the speed of rotation of the alternator. Since the rotating member of an alternator has substantial mass, arrangements for controlling the speed of rotation are necessarily complex, cumbersome and slow acting. Also, it is particularly difficult to synchronize the speed of rotation of a plurality of alternators so that their alternating currents are of the same frequency.

These difficulties are overcome in the present invention by controlling the magnetic field of an alternator so as to control the frequency of the alternating current which is produced. In accordance with the present invention, the field producing means for the alternator is arranged to provide a rotatable magnetic field for the armature of the alternator. By way of example, the field producing means for the alternator may be constructed in the same manner as the stator of an induction motor in order to produce the desired rotating magnetic field. Control signals are applied to the field producing means to control the direction and the speed of rotation of the magnetic field in some predetermined manner. By way of example, the control signals which are applied to the field producing means may be obtained by comparing a first reference signal having a frequency which is proportional to the speed of rotation of the alternator with a second reference signal of predetermined frequency to provide a plurality of control signals having frequencies which are governed by the difference in the frequencies of the two reference signals and having phase relationships which are governed by the phase relationships of the two reference signals. Such an arrangement causes the frequency of the alternating current which is produced by the alternator to be proportional to the frequency of the second reference signal. The second reference signal may be a fixed frequency if a constant frequency output is required, or it may be of variable frequency if a variable frequency output is required from the alternator. Also, a plurality of alternators may be controlled by a single reference signal so as to cause all of the alternators to produce signals having the same frequency.

The control arrangement of the present invention is relatively simple, it is of light weight, and it may be arranged in compact form. One of the great advantages of the present invention is that the frequency control is fast acting. Also, it permits the synchronization of a plurality of alternators with ease, even though the speed of rotation of the alternators is not identical.

The invention is explained in detail with reference to the drawings, in which.

Figure 1:
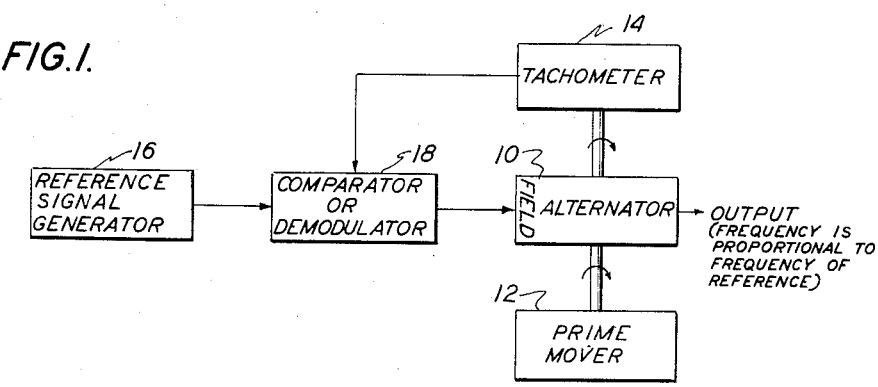
Fig. 1 is a block diagram which illustrates the basic aspect of the invention.

With reference to Fig. 1, an alternator 10 is driven by a prime mover 12. A tachometer 14 is coupled to the alternator, and the tachometer serves to provide a reference signal having a frequency which is proportional to the speed of rotation of the alternator. A reference signal generator 16 provides a reference signal which is compared with the signal which is produced by the tachometer in a comparator or demodulator 18, and the output of the demodulator 18 is applied to the field winding of the alternator so as to control the alternating current output of the alternator in accordance with the frequency of the signal which is produced by the reference signal generator 16.

The comparator or demodulator 18 may be of any suitable phase-sensitive type such as a demodulator type magnetic amplifier or the demodulator which is disclosed in Patent No. 2,650,335 which was granted to E. M. Leyton on August 25, 1953.

In many applications employing the present invention it is desirable to employ a reference signal of low level power to control the frequency of the alternator. With such an arrangement it is desirable to employ an amplifier type demodulator so as to provide the power required for the field winding of the alternator without requiring reference signal of substantial power. The demodulator serves to provide a plurality of output control signals having frequencies which are governed by the difference in the frequencies of the signals which are produced by the tachometer 14 and the reference signal generator 16 and having phase relationships which are governed by the phase relationships of the signals which are produced by the tachometer 14 and the reference signal generator 16. Preferably the number of control signals which are produced by the demodulator should correspond to the number of phases for the field windings of the alternator so as to simplify the logic of the connections between the tachometer and the demodulator and between the demodulator and the alternator.

The alternator may be either a rotating or a stationary armature type, and it may have any desired number of poles and phases. Preferably the alternator and the tachometer have the same number of poles so as to simplify the logic of the connections. The field winding of the alternator is arranged to produce a rotatable magnetic field for the armature. By way of example, the field winding may be constructed in the same manner as the stator winding of an induction motor.

In operation, the prime mover causes the alternator and the tachometer to rotate at predetermined speeds. The demodulator provides control signals to the field of the alternator which are governed by the reference signal generator 16 so as to cause the magnetic field which is produced by the field windings of the alternator to rotate at a speed and direction which causes the frequency of the alternating current which is produced by the alternator to be proportional to the frequency of the signal produced by the reference signal generator irrespective of the speed of rotation of the alternator. The signal which is provided by the reference signal generator may be fixed frequency, or it may be variable if desired.

If the frequency of the alternating current which is produced by the alternator is to be increased with respect to the frequency which the alternator would produce if the field was stationary, the field is caused to rotate in the direction of rotation of the armature, and vice versa.

Figure 2:
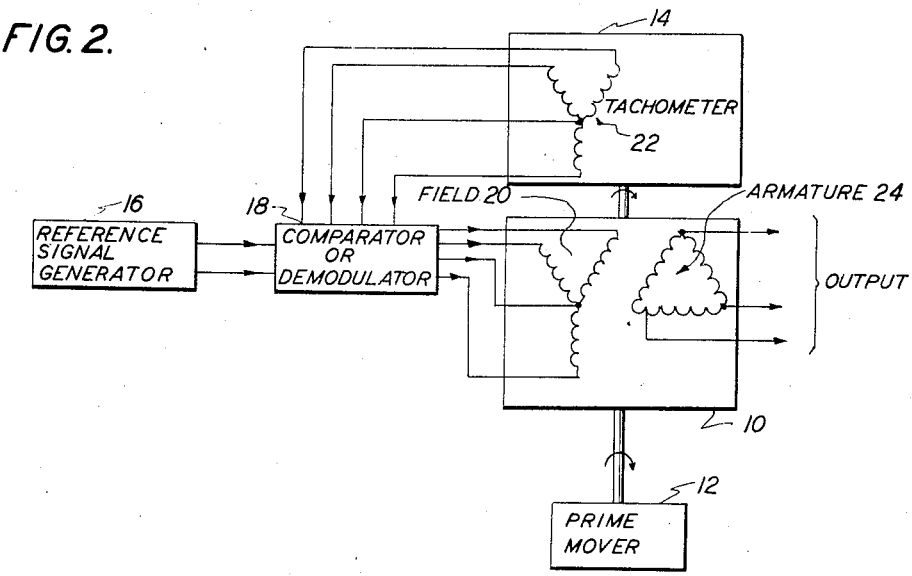
Fig. 2 is a schematic diagram, partially in block, illustrating an embodiment of the invention wherein the field winding of the alternator has three phases.

Fig. 2 illustrates an embodiment of the invention wherein a three-phase field winding 20 is employed for the alternator. The winding 22 for the tachometer is also three phase in the embodiment which is disclosed in the drawing. The three-phase signal which is produced by the tachometer is compared with a single phase reference signal which is produced by the reference signal generator 16, and the demodulator 18 provides three-phase control signals which are applied to the three-phase field winding of the alternator. The frequency and the phase relationships of the control signals which are applied to the field winding of the alternator are controlled by the frequencies and the phase relationships of the signal which is produced by the tachometer and the signal which is produced by the reference signal generator. These control signals which are produced by the demodulator cause the magnetic field which is produced by the field winding of the alternator to rotate in a direction and at the proper speed to cause the output which is produced by the armature 24 of the alternator to have a frequency which is proportional to the frequency of the signal which is produced by the reference signal generator.

If desired, a single phase tachometer may be employed in conjunction with a three-phase reference signal generator, instead of the arrangement which is illustrated in Fig. 2. If a single phase tachometer and a three-phase reference signal generator are employed, the signals are demodulated in the same manner to produce the same type control signals for the field winding of the alternator.

Figure 3:
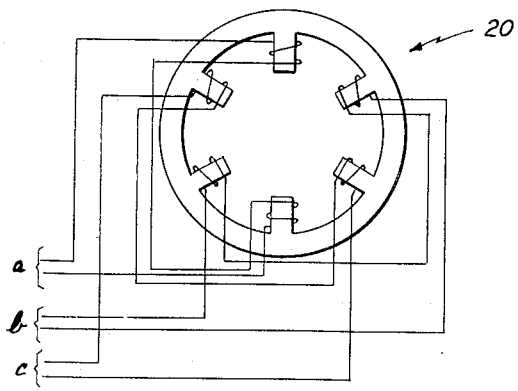
Fig. 3 is a simplified illustration of the three-phase field windings of the apparatus of Fig. 2.
Figure 4:
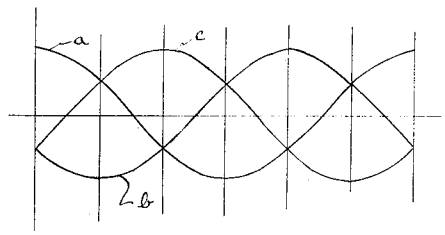
Fig. 4 illustrates three-phase signals which may be applied to the field windings of Fig. 3.

Fig. 3 is a simplified illustration of a three-phase field winding which may be employed in the apparatus of Fig. 2. The three phases are designated by the letters $a$, $b$ and $c$. When a three-phase field winding of this type is energized by three-phase current, such as illustrated in Fig. 4, the movement of the magnetic field is controlled by the frequency and the phase relationship of the three-phase signal which is employed to energize the field windings, as is well known in the art. The magnetic field may be caused to rotate in either direction and at substantially any speed by controlling the frequency and the phase relationship of the three-phase signal which is employed to excite the field winding. In the embodiment of the invention which is disclosed in Fig. 2, the three-phase signals which are applied to the field winding are produced by the demodulator 18 in response to the signals which are provided by the tachometer and the reference signal generator.

Figure 5:
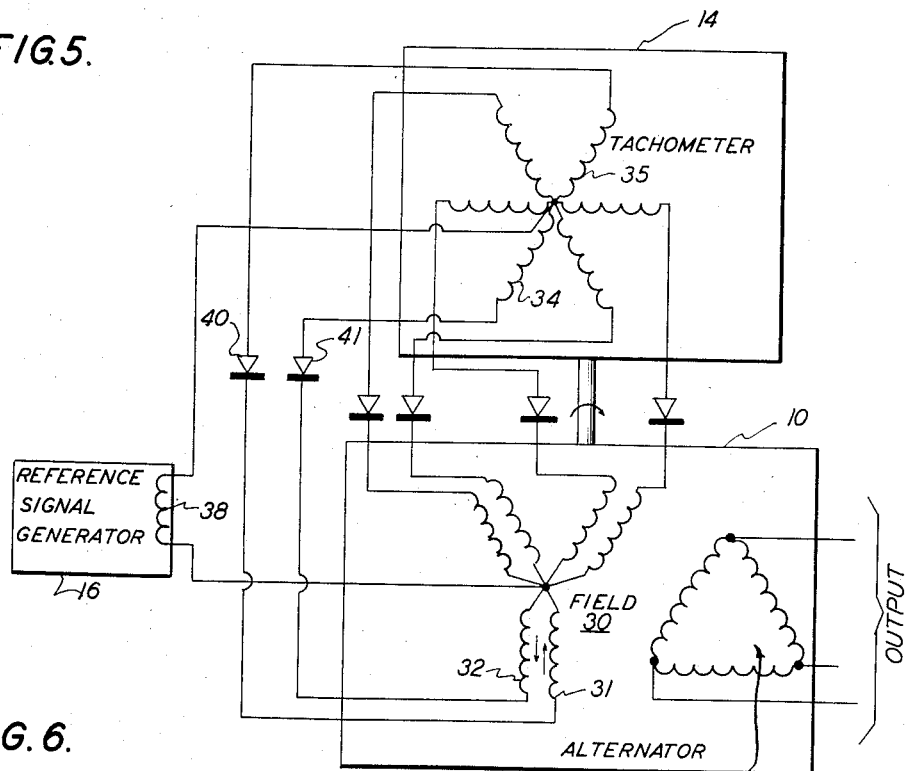
Fig. 5 illustrates an embodiment of the invention wherein the demodulator employs special windings on the tachometer and on the field winding of the alternator.

Fig. 5 is another embodiment of the invention which illustrates a simplified demodulator arrangement wherein special windings in the tachometer and in the field winding of the alternator are employed as part of the demodulator apparatus. A three-phase field winding 30 is employed in the alternator, and each phase comprises two bucking windings, such as the windings 31 and 32. The tachometer employs a three-phase winding, with each phase being divided in two portions, such as portions 34 and 35. The output circuit 38 of the reference signal generator is connected between the junction between the two portions of each phase of the tachometer and the junctions between the two portions of each phase of the field winding of the alternator.

The output of each phase of the tachometer is coupled through unidirectional conductors, such as the rectifiers 40 and 41, to the individual phases of the field winding of the alternator to complete a phase-sensitive demodulator circuit for each of the phases.

Figure 6:
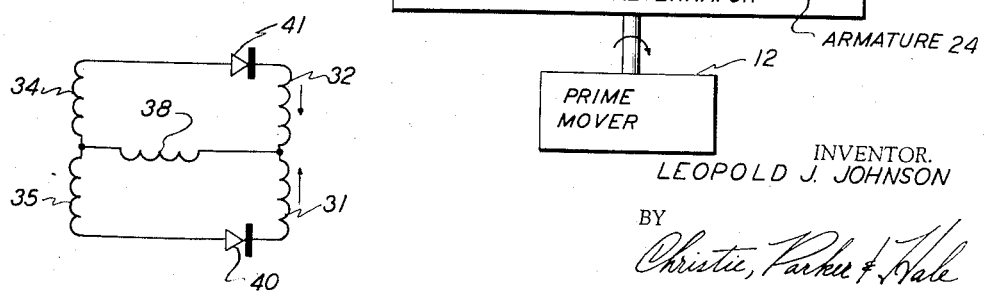
Fig. 6 illustrates the demodulator circuit for one of the phases of the apparatus of Fig. 5.

Fig. 6 illustrates a demodulator circuit which is formed by one of the phases of the apparatus of Fig. 5, and it will be noted that the circuit of Fig. 6 is a well-known demodulator circuit.

In the arrangement which is illustrated in Fig. 6, the signals which are produced by the tachometer and by the reference signal generator are added in one of the windings 31 and 32, and the signals are subtracted in the other winding of the windings 31 and 32 during each instant of time provided conduction is permitted by the unidirectional conductors of the demodulator circuit. The windings 31 and 32 are wound in bucking relationship so that the net field which is produced by the windings 31 and 32 provides a magnetic field which is equal to the difference between the magnetic fields which are produced by the individual windings 31 and 32.

Thus, the six portions of the field winding of the alternator and the six portions of the winding of the tachometer in conjunction with six unidirectional conductors provide three demodulator circuits of the type illustrated in Fig. 6 which operate in synchronism to provide the desired control over the magnetic field which is produced by the field winding of the alternator.

Figure 7:
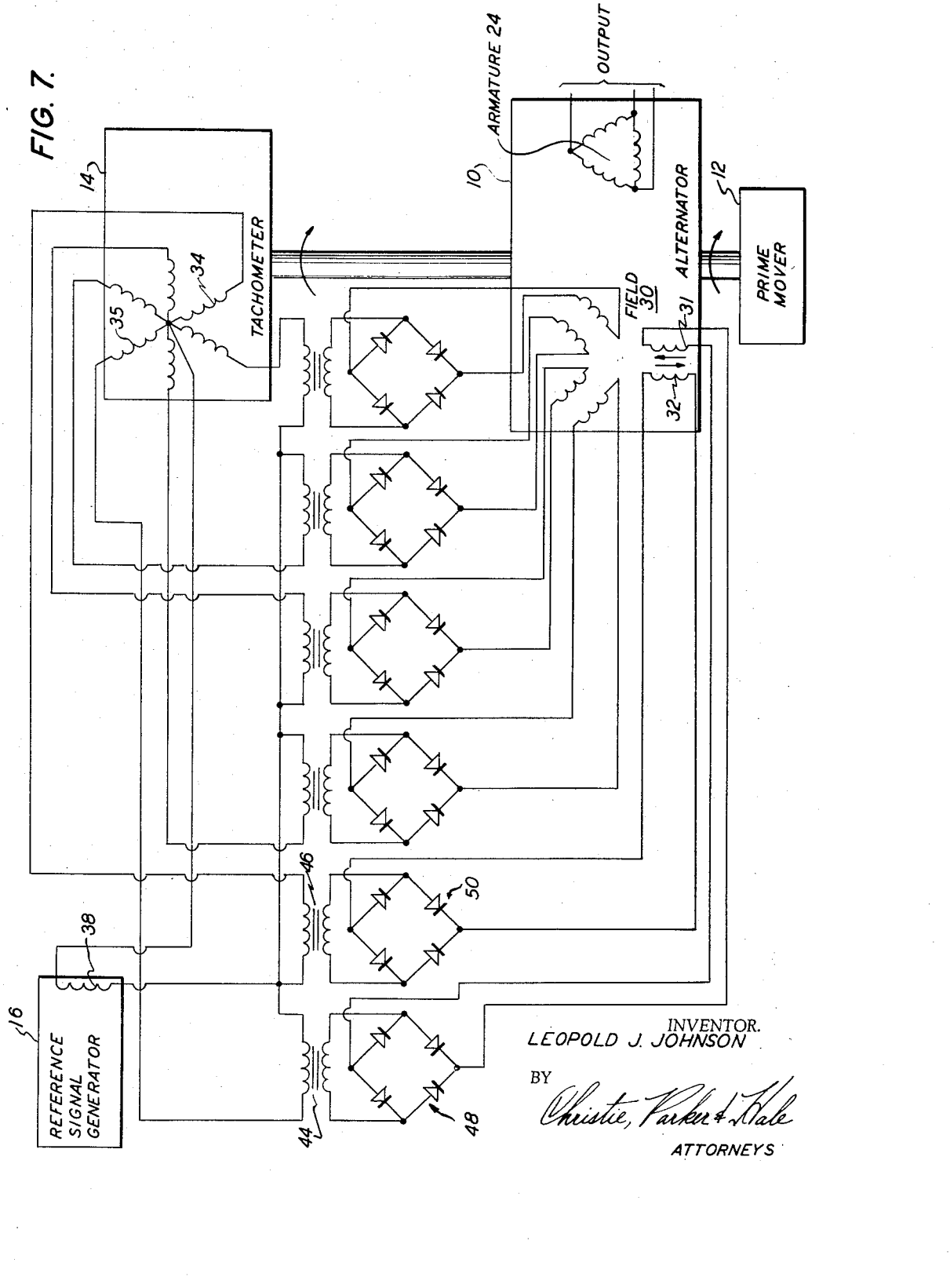
Fig. 7 illustrates a modification of the apparatus of Fig. 5 wherein full wave rectification is employed in the demodulator.

The apparatus of Fig. 5 employs a half-wave demodulator arrangement. Fig. 7 illustrates a modification of the apparatus of Fig. 5 wherein a full wave rectification arrangement is employed. In this embodiment of the invention, the field winding 30 of the alternator is a three-phase winding with each phase having two bucking windings, such as the windings 31 and 32, as before. Also, the tachometer is provided with three phases, with each phase being divided into two portions, such as portions 34 and 35. The output of each phase of the tachometer is applied across the primary windings of two transformers which are connected in series, such as the transformers 44 and 46. The secondary windings of the transformers for each phase are connected across two full-wave rectifiers, such as the rectifiers 48 and 50, and the outputs of the rectifiers are applied to the respective phases of the field winding of the alternator.

In this embodiment of the invention, the circuit which is associated with each pair of transformers serves to cause the circuit which is associated with one of the transformers to add and the circuit which is associated with the other transformer to subtract the signal which is produced by the reference signal generator and the signal produced by the tachometer for each instant of time. These sum and difference signals are applied to the two portions of each phase of the field winding, such as the portions 31 and 32. Since these two portions of the field windings are wound in bucking relationship, they produce a magnetic field which is proportional to the net difference between the sum and the difference signals.

Thus, the two portions of each phase of the tachometer, the two portions of each phase of the field windings, and the two transformers and two bridge rectifiers which are connected between each phase of the tachometer winding and each phase of the field winding form a demodulator circuit. The three demodulator circuits which are formed by the apparatus of Fig. 7 operate in synchronism to control the direction and speed of rotation of the magnetic field which is produced by the field winding of the alternator. This controls the frequency of alternating current which is produced by the alternator in accordance with the frequency of the signal which is produced by the reference signal generator.

Figure 8:
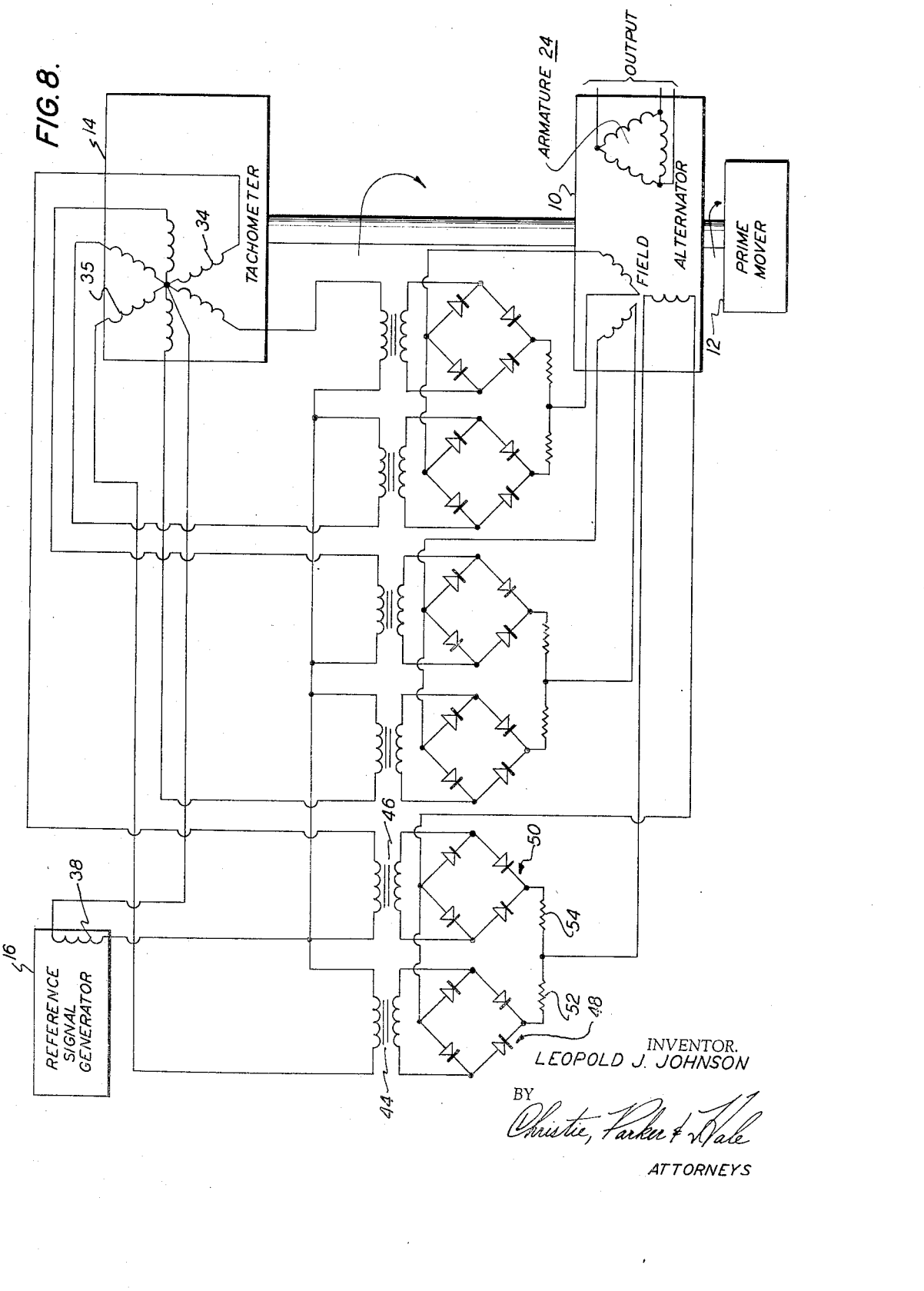
Fig. 8 illustrates a modification of the apparatus of Fig. 7 employing a field winding for the alternator which is of more simple construction.

Fig. 8 illustrates a modification of the apparatus of Fig. 7 wherein single windings are employed for each phase of the field winding of the alternator. A pair of resistors, such as the resistors 52 and 54, are coupled in series between each pair of bridge rectifiers and the corresponding phase of the field winding. The current which flows through these resistors to the respective phases of the field winding is proportional to the difference between the signals which are developed across each pair of bridge rectifiers, and hence these resistors perform the function of the bucking windings in the field winding which is illustrated in Fig. 7. The embodiment of Fig. 8 provides a simpler alternator construction, but it is not as efficient as the embodiment of Fig. 7 due to the losses which are produced by the resistors.

Figure 9:
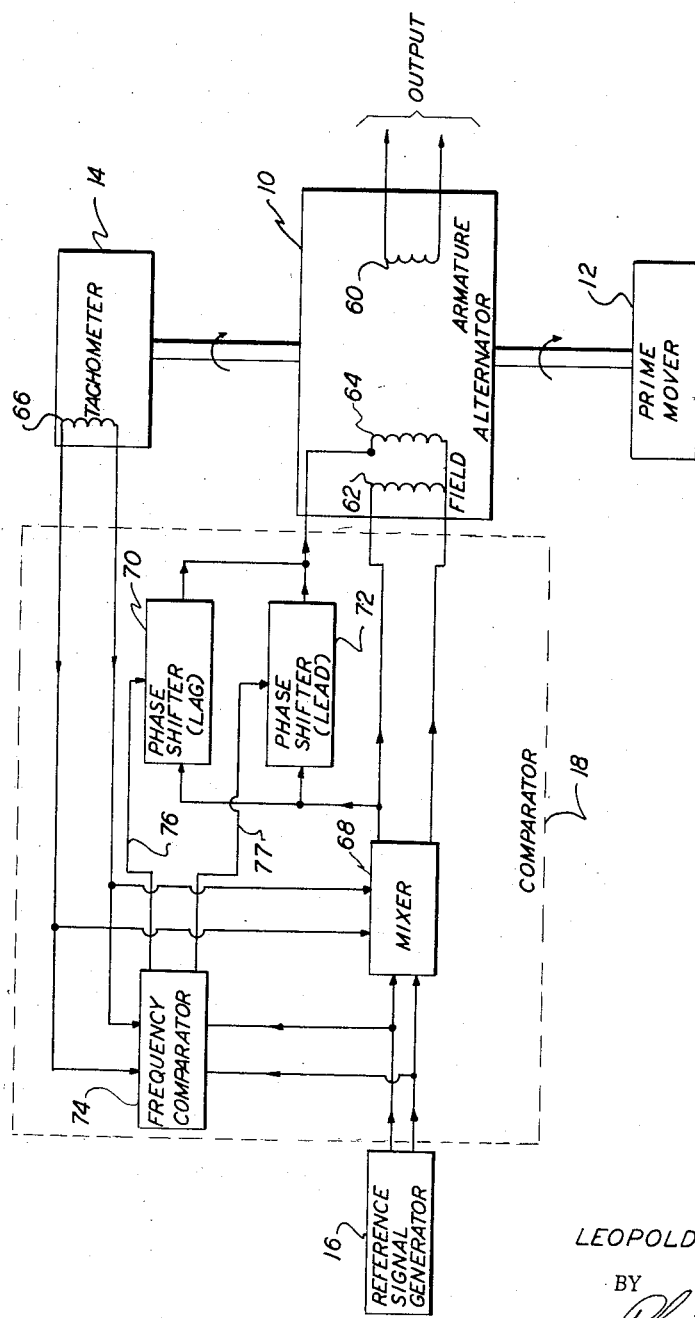
Fig. 9 illustrates an embodiment of the invention wherein a single-phase control signal is provided for the field winding of the alternator, and the signals for producing the rotating magnetic field are produced by phase-shifting devices.

Fig. 9 illustrates an embodiment of the invention wherein the signals for producing the rotating magnetic field for the alternator are produced by phase-shifting devices. In the embodiment of the invention which is shown in the drawing, a single-phase armature 60 and a pair of field windings 62 and 64 are employed in the alternator. A single-phase winding 66 is employed in the tachometer for producing a signal having a frequency which is proportional to the speed of rotation of the alternator.

The signal which is produced by the tachometer 14 and the signal which is produced by the reference signal generator 16 are applied to a mixer 68 which provides an output signal having a frequency which is equal to the difference between the frequencies of the signals which are produced by the tachometer 14 and the reference signal generator 16. The output of the mixer circuit 68 is applied to the field winding 62, and it is applied to the field winding 64 through a pair of phase shifting devices 70 and 72. The phase shifter 70 may be a conventional type which causes the signal produced at its output to lag the signal which is applied to its input. By way of example, the phase shifter 70 may be a saturable reactor. The phase shifter 72 may be a conventional type which causes the signal which is produced at its output to lead the signal which is applied to its input. By way of example, the phase shifter 72 may be a saturable capacitor.

The phase shifters are controlled by the signals which are produced at the output of a frequency comparator 74. The frequency comparator is coupled to receive the signal which is produced by the tachometer 14, and it serves to produce output signals on the leads 76 and 77 which are representative of the relationship between the frequency of the signal which is produced by the tachometer 14 and a predetermined reference frequency. This reference frequency may be derived from the signal which is produced by the reference signal generator 16, as is illustrated in the drawing. In the alternative, the frequency comparator 74 may be provided with a resonant circuit which is tuned to a predetermined reference frequency. With a resonant circuit arrangement, the signal which is produced by the tachometer is compared to the reference frequency of the tuned circuit.

The frequency comparator 74 provides a direct current signal of one polarity on one of the leads 76, 77 when the frequency of the signal from the tachometer is less than the reference frequency, and the frequency comparator 74 provides a direct current signal of the opposite polarity over the other lead of the leads 76, 77 when the frequency of the signal from the tachometer is greater than the reference frequency. The signals are applied through the leads 76 and 77 to the two phase shifters which serve to shift the phase of the alternating current which is applied through them to the field winding 64 in accordance with the magnitude of the direct current signals which are applied to the respective phase shifters.

In operation, the signals which are produced by the tachometer 14 and the reference signal generator 16 are applied to the mixer 68 to produce a beat frequency signal which is equal to the difference between the frequencies of these two signals. This beat frequency controls the rate of rotation of the magnetic field which is produced by the field windings of the alternator. The direction of rotation of the magnetic field is controlled by the phase shift which is introduced by the phase shifters 70 and 72, which in turn is controlled by the magnitude and polarity of the signals which are produced at the output leads 76 and 77 of the frequency comparator 74.

From the various embodiments of the invention which have been illustrated, it will be apparent that many types of circuits may be employed in carrying out the present invention. The comparator or demodulator circuit may be entirely separate and distinct from the field and tachometer windings, or it may employ the field and tachometer windings as part of the actual circuit for providing demodulation. Also, various types of field and tachometer circuits may be employed. Various numbers of phases may be employed in the tachometer and in the armature and field windings for the alternator, and it is not necessary that the phases of the tachometer and the field winding of the alternator be equal. Well known phase-changing devices may be employed to provide the signals which are required to produce a rotating magnetic field for the field winding of the alternator.

I claim:

1. Apparatus for producing alternating current having a controlled frequency comprising an alternator having an armature for producing an alternating current output and having a plurality of field windings for producing a magnetic field for the armature, the field windings providing a plurality of magnetic poles disposed around the direction of rotation of the armature, means for applying alternating current signals to the respective field windings to cause the field windings to produce a rotating magnetic field, and means for controlling the phase relationship and frequency of the alternating currents which are applied to the field windings so as to control the direction and speed of rotation of the magnetic field which is produced by the field windings.

2. Apparatus for producing alternating current having a controlled frequency comprising an alternator having an armature for producing an alternating current output and having a plurality of field windings for producing a magnetic field for the armature, the field windings providing a plurality of magnetic poles disposed around the direction of rotation of the armature, means for applying signals to the respective field windings, and means for controlling the phase relationship and frequency of the respective signals which are applied to the field windings so as to control the magnetic field which is produced by the field windings and thereby control the frequency of the alternating current which is produced by the armature.

3. Apparatus for producing alternating current having a controlled frequency comprising an alternator having an armature for producing an alternating current output and having field producing means for producing a rotatable magnetic field for the armature, means coupled to the alternator for producing a first reference signal having a frequency which is proportional to the speed of rotation of the alternator, means for providing a second reference signal of predetermined frequency, and means coupled between the means for producing the first and the second reference signals and the field producing means of the alternator for providing control signals to the field producing means to control the direction and the speed of rotation of the magnetic field.

4. Apparatus for producing alternating current having a controlled frequency comprising an alternator having an armature for producing an alternating current output and having a plurality of field windings for producing a magnetic field for the armature, the field windings providing a plurality of magnetic poles disposed around the direction of rotation of the armature, means for producing relative rotary motion between the field windings and the armature, means for producing a first reference signal having a frequency which is proportional to the speed of rotation between the field windings and the armature, means for providing a second reference signal of predetermined frequency, means for comparing the first and second reference signals and providing a plurality of control signals having frequencies which are governed by the difference in the frequencies of the first and second reference signals and having phase relationships which are governed by the phase relationships of the first and second reference signals, and means coupling the control signals to the field windings to control the direction and speed of rotation of the magnetic field which is produced by the field windings and thereby control the frequency of the alternating current which is produced by the armature in accordance with the frequency of the second reference signal.

5. Apparatus for producing alternating current having a controlled frequency comprising an alternator having an armature for producing an alternating current output and having a plurality of field windings for producing a magnetic field for the armature, the field windings having a plurality of phases and providing a plurality of magnetic poles disposed around the direction of rotation of the armature, means for producing rotary motion between the field windings and the armature, tachometer means coupled to the alternator for producing first reference signals having a frequency which is proportional to the speed of rotation between the field windings and the armature, a generator for providing a second reference signal of predetermined frequency, demodulator means responsive to the first and second reference signals for providing a plurality of control signals having frequencies which are governed by the difference in the frequencies of the first and second reference signals and having phase relationships which are governed by the phase relationships of the first and second reference signals, with the number of control signals corresponding to the number of phases for the field windings of the alternator, and means coupling the control signals to the field windings to control the direction and speed of rotation of the magnetic field which is produced by the field windings and thereby control the frequency of the alternating current which is produced by the armature in accordance with the frequency of the second reference signal.

6. The apparatus of claim 5 wherein the demodulator means comprises means for adding and for subtracting the second reference signal and the first reference signals which are produced by the tachometer means and for providing control signals representative of the net difference between the sum and the difference of the signals, and means coupling the control signals to the field windings of the alternator to control the direction and speed of rotation of the magnetic field which is produced by the field windings and thereby control the frequency of the alternating current which is produced by the alternator in accordance with the frequency of the second reference signal.

7. The apparatus of claim 5 wherein the tachometer means has the same number of phases as the field windings of the alternator, wherein each phase of the tachometer means and each phase of the field windings of the alternator has two portions, and wherein the demodulator means comprises means connecting the generator which produces the second reference signal between the junctions between the two portions of each phase of the tachometer means and the junctions between the two portions of each phase of the field windings, and unidirectional conductors coupling the output of each phase of the tachometer means to individual phases of the field winding of the alternator to form a phase-sensitive demodulator circuit for each of the phases.

8. The apparatus of claim 5 wherein the tachometer means has the same number of phases as the field windings of the alternator, wherein each phase of the tachometer means and each phase of the field windings of the alternator has two portions, and wherein the demodulator means comprises means for adding and for subtracting the second reference signal and the signals produced by each phase of the tachometer means, and rectifier means coupled between the respective means for adding and for subtracting the signals and the individual portions of the field windings of the alternator to control the direction and speed of rotation of the magnetic field which is produced by the field windings and thereby control the frequency of the alternating current which is produced by the armature in accordance with the frequency of the second reference signal.

9. Apparatus for producing alternating current having a controlled frequency comprising an alternator having an armature for producing an alternating current output and having field producing means for producing a rotatable magnetic field for the armature, means coupled to the alternator for producing a first reference signal having a frequency which is proportional to the speed of rotation of the alternator, means for providing a second reference signal of predetermined frequency, and means coupled between the means for producing the first and second reference signals and the field producing means of the alternator and including phase-shifting means responsive to the difference in frequency between the first and second reference signals for providing control signals to the field producing means to control the direction and the speed of rotation of the magnetic field in accordance with the difference in frequency between the first and second reference signals.

10. Apparatus for producing alternating current having a controlled frequency comprising an alternator having an armature for providing an alternating current output and having at least two field windings for producing a magnetic field for the armature, the field windings providing a plurality of magnetic poles disposed around the direction of rotation of the armature, a source for providing an alternating current, sensing means coupled to the alternator for producing an alternating current signal having a frequency representative of the speed of rotation of the armature, means for combining the signals produced by said source and by said sensing means to provide a control signal having a frequency determined by the difference in frequency of the combined signals, means coupled between the combining means and one of the field windings of the alternator for applying said control signal to the field winding, phase-shifting means coupled between the combining means and the other field windings of the alternator for applying a phase-shifted version of said control signal to the other field windings, and comparator means coupled to said source and to said sensing means for comparing the frequencies of the alternating current signals produced by said source and said sensing means and providing an output signal coupled to the phase-shifting means for controlling the phase of the signal which is applied through the phase-shifting means to the field windings of the alternator, whereby the direction and speed of rotation of the magnetic field which is provided by the field windings is controlled to thereby control the frequency of the alternating current which is produced by the alternator.

No references cited.

Notice of Adverse Decision in Interference

In Interference No. 90,151 involving Patent No. 2,854,617, L. J. Johnson, Frequency control apparatus for alternators, final decision adverse to the patentee was rendered Apr. 1, 1963, as to claims 3, 4, 5 and 6.

[*Official Gazette September 3, 1963.*]